(12) United States Patent
Jayaraman et al.

(10) Patent No.: US 11,611,232 B2
(45) Date of Patent: *Mar. 21, 2023

(54) SYSTEMS AND METHODS FOR PROVIDING DIRECT CURRENT AND ALTERNATING CURRENT FROM A POWER SUPPLY TO A LOAD

(71) Applicant: SCHNEIDER ELECTRIC IT CORPORATION, Foxboro, MA (US)

(72) Inventors: Chandrasekaran Jayaraman, Bangalore (IN); Pradeep Tolakanahalli Nagabhushanrao, Bangalore (IN); Pavan Kumar Gudipalli, Bangalore (IN); Nagaraju Ingurthi, Bangalore (IN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/837,220

(22) Filed: Jun. 10, 2022

(65) Prior Publication Data

US 2022/0302748 A1 Sep. 22, 2022

Related U.S. Application Data

(63) Continuation of application No. 17/111,614, filed on Dec. 4, 2020, now Pat. No. 11,381,107.

(Continued)

(51) Int. Cl.
*H02J 9/06* (2006.01)
*H02M 3/158* (2006.01)

(52) U.S. Cl.
CPC .............. *H02J 9/062* (2013.01); *H02J 9/061* (2013.01); *H02M 3/158* (2013.01)

(58) Field of Classification Search
CPC ........... H02J 9/062; H02J 9/061; H02M 3/158
(Continued)

(56) References Cited

U.S. PATENT DOCUMENTS 5,994,795 A 11/1999 Gabillet
6,079,026 A 6/2000 Berglund et al.
(Continued)

FOREIGN PATENT DOCUMENTS

KR 101297287 B1 8/2013

OTHER PUBLICATIONS

Extended European Search Report from corresponding European Application No. 20213844.2 dated Mar. 9, 2021.

*Primary Examiner* — Michael R. Fin
(74) *Attorney, Agent, or Firm* — Lando & Anastasi, LLP

(57) ABSTRACT

A power system including an input configured to receive input AC power, a DC output configured to provide output DC power to a load, an AC output configured to provide output AC power to the load, an AC/DC converter coupled to the input and configured to convert the input AC power into DC power, a DC bus, and a controller configured to monitor a current demand at the DC output relative to a demand threshold, operate, in response to a determination that the current demand at the DC output is below the demand threshold, the power system in a first mode of operation by enabling the AC/DC converter to provide DC power to the DC bus, and operate, in response to a determination that the current demand at the DC output is above the demand threshold, the power system in a second mode of operation by disabling the AC/DC converter.

22 Claims, 7 Drawing Sheets

Related U.S. Application Data

(60) Provisional application No. 62/950,305, filed on Dec. 19, 2019.

(58) Field of Classification Search
 USPC .................................................. 307/98, 64
 See application file for complete search history.

(56) References Cited

U.S. PATENT DOCUMENTS

| | | |
|---|---|---|
| 10,958,098 B1 | 3/2021 | Li et al. |
| 2009/0256422 A1 | 10/2009 | Fox et al. |
| 2015/0121113 A1 | 4/2015 | Ramamurthy et al. |
| 2016/0056666 A1 | 2/2016 | Choi et al. |
| 2016/0241082 A1 | 8/2016 | Stoevring |
| 2019/0267811 A1 | 8/2019 | Sarti et al. |
| 2021/0135487 A1 | 5/2021 | Sok et al. |
| 2021/0194274 A1 | 6/2021 | Nagabhushanrao et al. |

| Sl. No. | AC condition | DC-UPS state | Load State | Description |
|---|---|---|---|---|
| 252 | Acceptable | AC Mode | AC Mode | Charger charges the battery. DC/DC Converter at near no load. Load draws full power from the AC. |
| 254 | Intermediate-1 | AC Mode | DC Mode | Charger charges the battery. DC/DC supports the full load power. |
| 256 | Intermediate-2 | DC Mode | AC Mode | Charger is switched off. Battery powers DC/DC converter at near no load. Load draws full power from the AC. |
| 258 | Unacceptable | DC Mode | DC Mode | Charger is switched off. Battery powers DC/DC converter and supports the full load power. |

FIG. 2B

SYSTEMS AND METHODS FOR PROVIDING DIRECT CURRENT AND ALTERNATING CURRENT FROM A POWER SUPPLY TO A LOAD

CROSS-REFERENCE TO RELATED APPLICATIONS

This application claims priority under 35 U.S.C. § 120 as a continuation of U.S. patent application Ser. No. 17/111,614, titled "SYSTEMS AND METHODS FOR PROVIDING DIRECT CURRENT AND ALTERNATING CURRENT FROM A POWER SUPPLY TO A LOAD," filed Dec. 4, 2020, which claims priority under 35 U.S.C. § 119(e) to U.S. Provisional Application Ser. No. 62/950,305 titled "SYSTEMS AND METHODS FOR PROVIDING DIRECT CURRENT AND ALTERNATING CURRENT FROM A POWER SUPPLY TO A LOAD," filed on Dec. 19, 2019. Each application referenced above is hereby incorporated by reference in its entirety.

BACKGROUND

1. Field of Invention

The present disclosure relates generally to power supplies. More particularly, aspects of the present disclosure relate to systems and methods for providing direct current and alternating current from a power supply to a load.

2. Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's, as well as others. On-line UPS's provide conditioned AC power as well as back-up AC power upon interruption of a primary source of AC power. Off-line UPS's typically do not provide conditioning of input AC power but do provide back-up AC power upon interruption of the primary AC power source. Line interactive UPS's are similar to off-line UPS's in that they switch to battery power when a blackout occurs but also typically include a multi-tap transformer for regulating the output voltage provided by the UPS.

SUMMARY

At least one aspect of the present disclosure is directed to an Uninterruptible Power Supply (UPS). The UPS includes an input configured to receive input AC power, a DC output configured to provide output DC power to a load, an AC output configured to provide output AC power to the load, a charger coupled to the input and configured to convert the input AC power into DC power, a DC bus coupled to the charger and configured to receive the DC power, a bypass line coupled between the input and the AC output and configured to provide the input AC power to the AC output as the AC output power, and a controller coupled to the charger and configured to monitor a current demand at the DC output relative to a demand threshold operate, in response to a determination that the current demand at the DC output is below the demand threshold, the UPS in a first mode of operation by enabling the charger to provide DC power to the DC bus and operate, in response to a determination that the current demand at the DC output is above the demand threshold, the UPS in a second mode of operation by disabling the charger.

In one embodiment, the UPS includes an auxiliary power interface coupled to the DC bus, the auxiliary power interface configured to provide DC power from the DC bus to an auxiliary power source and to receive DC power from the auxiliary power source. In some embodiments, during the first mode of operation, the auxiliary power source is configured to receive the DC power provided by the charger for charging the auxiliary power source. In certain embodiments, the UPS includes a DC-DC converter coupled to the DC bus and configured to convert the DC power from the DC bus into the output DC power. In various embodiments, during the second mode of operation, the controller is further configured to operate the DC-DC converter to convert the DC power provided by the auxiliary power source into the output DC power.

In some embodiments, the demand threshold is a predetermined threshold. In one embodiment, the UPS is configured to operate in the first mode of operation to support the load while the load is drawing AC power from the AC output. In various embodiments, the UPS is configured to operate in the second mode of operation to support the load while the load is drawing DC power from the DC output.

Another aspect of the present disclosure is directed to an Uninterruptible Power Supply (UPS). The UPS includes an input configured to receive input AC power, a DC output configured to provide output DC power to a load, an AC output configured to provide output AC power to the load, a charger coupled to the input and configured to convert the input AC power into DC power, a DC bus coupled to the charger and configured to receive the DC power, a bypass line coupled between the input and the AC output and configured to provide the input AC power to the AC output as the AC output power, and a controller coupled to the charger and configured to monitor a current demand at the AC output relative to a demand threshold, operate, in response to a determination that the current demand at the AC output is above the demand threshold, the UPS in a first mode of operation by enabling the charger to provide DC power to the DC bus, and operate, in response to a determination that the current demand at the AC output is below the demand threshold, the UPS in a second mode of operation by disabling the charger.

In one embodiment, the UPS includes an auxiliary power interface coupled to the DC bus, the auxiliary power interface configured to provide DC power from the DC bus to an auxiliary power source and to receive DC power from the auxiliary power source. In some embodiments, during the first mode of operation, the auxiliary power source is configured to receive the DC power provided by the charger for charging the auxiliary power source. In various embodiments, a DC-DC converter coupled to the DC bus and configured to convert the DC power from the DC bus into the output DC power. In certain embodiments, during the second mode of operation, the controller is further configured to operate the DC-DC converter to convert the DC power provided by the auxiliary power source into the output DC power.

In some embodiments, the demand threshold is a predetermined threshold. In one embodiment, the UPS is configured to operate in the first mode of operation to support the load while the load is drawing AC power from the AC output. In various embodiments, the UPS is configured to operate in the second mode of operation to support the load while the load is drawing DC power from the DC output.

Another aspect of the present disclosure is directed to a non-transitory computer-readable medium storing thereon sequences of computer-executable instructions for operating an Uninterruptible Power Supply (UPS). The sequences of computer-executable instructions include instructions that instruct at least one processor to control the UPS to receive input AC power at an input from an input power source, provide, via a DC output, output DC power to a load, provide, via an AC output, output AC power to the load, monitor a current demand at the DC output relative to a demand threshold, operate, in response to a determination that the current demand at the DC output is below the demand threshold, the UPS in a first mode of operation by enabling a charger coupled to the input to convert the input AC power into DC power, and operate, in response to a determination that the current demand at the DC output is above the demand threshold, the UPS in a second mode of operation by disabling the charger.

In one embodiment, the sequences of instructions include instructions that instruct the at least one processor to control the UPS to provide, in the first mode of operation, the DC power from the charger to a DC bus to charge an auxiliary power source coupled to the DC bus, and provide, in the second mode of operation, DC power from the auxiliary power source to a DC-DC converter coupled to the DC bus, the DC-DC converter being configured to convert the DC power from the auxiliary power source into the output DC power. In some embodiments, the UPS is operated in the first mode of operation to support the load while the load is drawing AC power from the AC output. In various embodiments, the UPS is operated in the second mode of operation to support the load while the load is drawing DC power from the DC output.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 2B is a table of operational configurations of a power supply system in accordance with aspects described herein;

DETAILED DESCRIPTION

Figure 1:
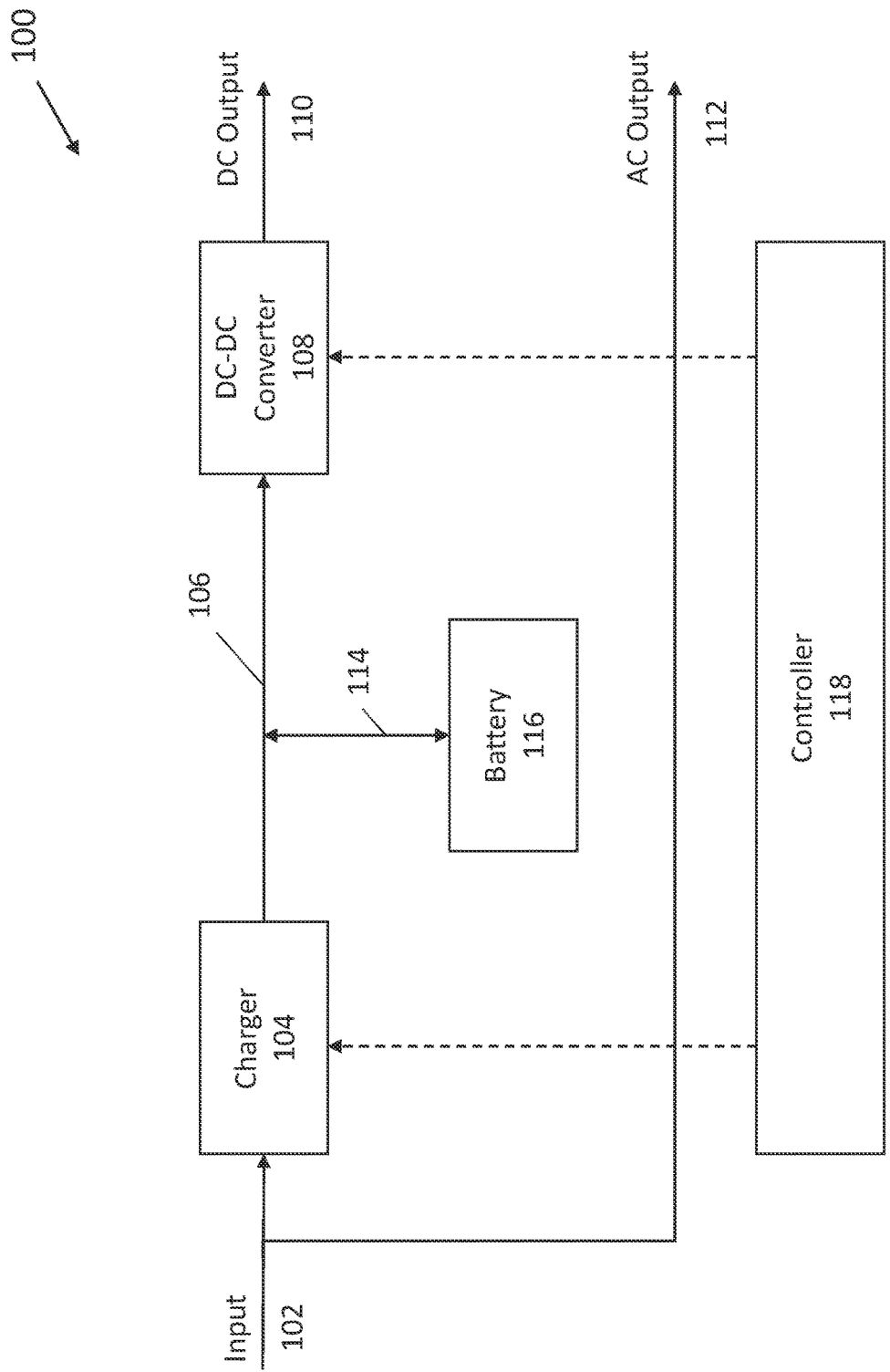
FIG. 1 is a functional block diagram of a UPS in accordance with aspects described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power supplies, such as uninterruptible power supplies (UPS), are often times used to provide regulated, uninterrupted power to sensitive and/or critical loads. An offline UPS connects a load directly to utility power when utility power is available and sufficient to power a load. The offline UPS also includes a charger which utilizes the utility power to charge a backup power source (e.g., a battery). When utility power is unavailable or insufficient to power the load, the offline UPS operates a DC/AC inverter to convert DC power from the backup power source into desired AC power, which is provided to the load.

An online UPS rectifies input AC power provided by an electric utility using a Power Factor Correction converter circuit (PFC) to provide DC power to at least one DC bus. The rectified DC power on the DC bus(es) may be used to charge a battery while mains power is available. In the absence of mains power, the battery discharges and provides DC power to the DC bus(es). From the DC power on the DC bus(es), an inverter generates an AC output voltage that is provided to a load. Since power is provided to the DC bus(es) from either mains or the battery, the output power of the UPS is uninterrupted if the mains fails and the battery is sufficiently charged. Online UPS's may also operate in a bypass mode where unconditioned power with basic protection is provided directly from an AC power source to a load via a bypass line.

Similarly, a UPS can be configured as a Direct Current (DC)-UPS. A DC-UPS utilizes an AC/DC converter to convert input AC power provided by an electric utility into DC power and provide the converted DC power to at least one DC bus. The DC power on the DC bus(es) may be used to charge a battery while mains power is available. In the absence of mains power, the battery discharges and provides DC power to the DC bus(es). From the DC power on the DC bus(es), a DC/DC converter generates a DC output voltage that is provided to a load. DC-UPS's may also include an AC output coupled to the input to provide AC output power to the load. FIG. 1 is a block diagram of one embodiment of a UPS 100. In one example, the UPS 100 is configured as a DC-UPS. The UPS 100 includes an input 102, a charger 104, a DC bus 106, a DC/DC converter 108, a DC output 110, an AC output 112, and a backup power interface 114. In some examples, the backup power interface 114 is configured to receive backup DC power from a battery 116. In certain examples, the UPS 100 may include the battery 116; however, in other examples the battery 116 may be external to the UPS 100.

In addition, a controller 118 may be included in the UPS 100. In one example, the controller 118 is coupled to and configured to operate the charger 104 and the DC/DC converter 108. In certain examples, the controller 118 is external to the UPS 100. In some examples, the controller 118 includes one or more general computing processors, specialized processors, or microcontrollers. The controller 118 may include specially-programmed, special-purpose hardware, for example, an application-specific integrated circuit (ASIC), or more generally designed hardware, such as a field programmable gate array (FPGA), or a general purpose processor. In some examples, the controller 118 is connected to one or more memory devices, such as a disk drive, memory, flash memory, embedded or on-chip memory, or other device for storing data. In certain examples, the controller 118 may be one or more controllers including one or more components such as one or more processors.

As shown, the input 102 is coupled to the charger 104 and the AC output 112. The DC bus 106 is coupled between the charger 104 and the DC/DC converter 108. The DC output 110 is coupled to the DC/DC converter 110. The backup power interface 114 is coupled to the DC bus 106.

The UPS 100 is generally configured to operate in one of at least two modes of operation, including an AC mode and DC mode. In one example, the mode of operation of the UPS 100 is dependent upon a quality level of AC power received at the input 102. For example, when the AC power received at the input 102 is acceptable (i.e., within a specified range of acceptable electrical parameters), the UPS 100 may be configured to operate in the AC mode. Otherwise, when the AC power received at the input 102 is not acceptable (i.e., not within a specified range of acceptable electrical parameters), the UPS 100 may be configured to operate in the DC mode. In some examples, the controller 118 is coupled to the input 102 and configured to monitor the input 102 to determine whether to operate the UPS 100 in the AC mode or the DC mode.

In the AC mode, the input 102 receives AC power from an external source (for example, from a utility mains AC power supply) and provides the received power to the AC output 112 and to the charger 104. The AC output 112 receives the AC power from the input 102 and provides the AC power to an external load (not shown). While not shown, a filter circuit may be employed between the input 102 and the AC output 112. The charger 104 receives the AC power from the input 102, converts the AC power into DC power, and charges the battery 116 (via the backup power interface 114) with the DC power derived from the input 102.

In the DC mode, the charger 104 is turned off (i.e., disabled) and discontinues charging the battery 116. The battery 116 discharges stored DC power to the DC/DC converter 108, via the backup power interface 114 and the DC bus 106. The DC/DC converter 108 regulates DC power received from the battery 116 and provides regulated DC power to the DC output 110. The DC output 110 receives the power from the DC/DC converter 108 and provides the DC power to the external load.

In some cases, DC-UPS's (e.g., UPS 100) can be used to provide power to Information Technology (IT) equipment. The IT load may have multiple operating states with its own intelligent decision-making unit (e.g., controller). For example, the IT load may have an AC input and a DC input and be configured to operate in an AC mode and a DC mode. As such, the DC-UPS and the IT load may together form a power supply system having a plurality of operational configurations.

It is typically desired for the DC-UPS and the load to both be operating in a similar configuration (e.g., both in an AC mode or both in a DC mode). However, often times the UPS (e.g., 100) is developed by one entity (e.g., a vendor) while the load (e.g., 202) is developed by another entity (e.g., a customer). As such, the vendor may have limited or no access to detailed-design descriptions and/or behavior of the load. This may pose a challenge to the vendor to ensure that the UPS works in the same mode as the load (e.g., AC or DC mode). For example, the UPS may utilize different criteria (e.g., thresholds) than the load for determining which mode to operate in. In many cases, there may be no communication between the UPS and load, and the UPS may be unable to determine which mode the load is operating in, or vice versa.

As such, an improved system and method for controlling a UPS is provided herein. In at least one embodiment, the current demand at the DC output and/or the AC output of the UPS is monitored relative to a demand threshold. In one example, based on a comparison of the current demand and the demand threshold, the UPS is operated in either the AC mode or the DC mode to match the operating mode of the load. In some examples, transitioning the UPS between the AC and DC modes of operation includes enabling/disabling the charger of the UPS.

Figure 2A:
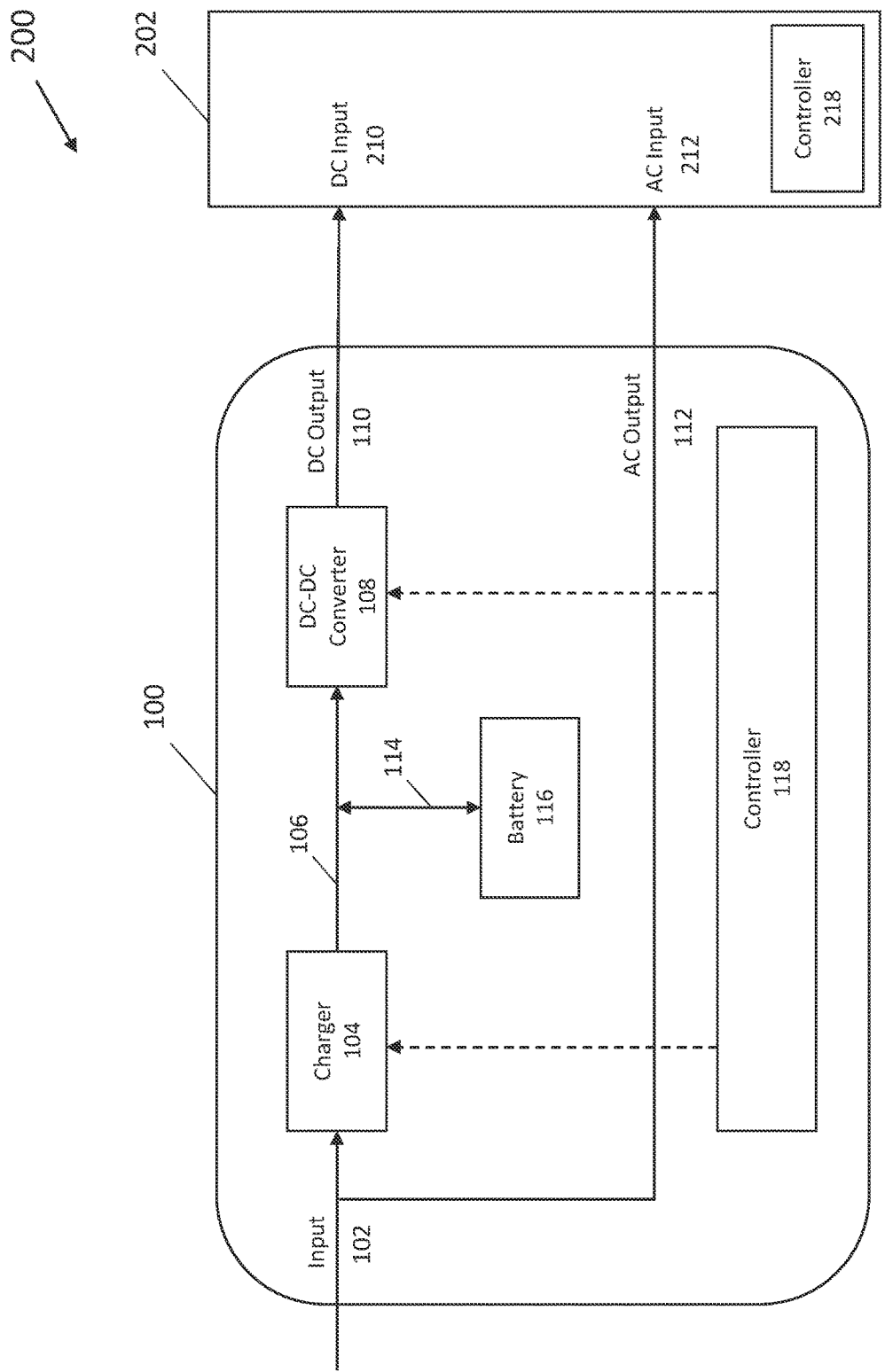
FIG. 2A is a functional block diagram of a power supply system in accordance with aspects described herein.

FIG. 2A a block diagram of one embodiment of a power supply system 200 in accordance with aspects described herein. As shown, the power supply system 200 includes the UPS 100 and a load 202. In one example, the load 202 is an IT load having a DC input 210 and an AC input 212. The DC output 110 of the UPS 100 is coupled to the DC input 210 of the load 202. Likewise, the AC output 112 of the UPS 100 is coupled to the AC input 212 of the load 202.

As described above, the load 202 may be configured to operate in an AC mode and a DC mode. In one example, the load 202 includes a load controller 218 configured to operate the load 202 in the AC and DC modes. In some examples, the load controller 218 monitors the AC input 212 and/or the DC input 210 to determine whether to operate the load 202 in the AC mode or the DC mode. For example, when the AC power provided by the UPS 100 to the AC input 212 is acceptable (i.e., above a power quality threshold), the load controller 218 may operate the load 202 in the AC mode. Similarly, when the AC power provided by the UPS 100 to the AC input 212 is unacceptable (i.e. below a power quality threshold), the load controller 218 may operate the load 202 in the DC mode.

In some examples, there is no communication between the UPS 100 and the load 202, and the UPS 100 may be unable to determine which mode the load 202 is operating in, or vice versa. For example, the UPS 100 may utilize different criteria (e.g., thresholds) than the load 202 for determining which mode to operate in (e.g., AC or DC). As such, the power supply system 200 may operate in various desirable and undesirable configurations depending on the quality level of the input AC power.

For example, FIG. 2B is a table 250 illustrating various operational configurations of the power supply system 200 in accordance with aspects described herein. In a first scenario 252, the AC power received at both the input 102 of the UPS 100 and the AC input 212 of the load 202 is recognized as being "acceptable" by both the UPS 100 and the load 202. As a result, both the UPS 100 and the load 202 operate in their respective AC modes of operation. In the AC mode of the UPS 100, the received AC power is provided to the AC output 112 and to the charger 104. The AC output 112 receives the power from the input 102 and provides the AC power to the AC input 212 of the load 202. The charger 104 converts the AC power into DC power and charges the battery 116. While operating in the AC mode, the load 202 draws AC power via the AC input 212. As such, the DC/DC converter 108 of the UPS 100 operates in a no-load state, since the load 202 is not drawing power via the DC input 210.

In a second scenario 254, the AC power received at both the input 102 of the UPS 100 and the AC input 212 of the load 202 is recognized as being "acceptable" by the UPS 100 and "unacceptable" by the load 202. As a result, the UPS 100 operates in the AC mode and the load 202 operates in the DC mode. In the AC mode of the UPS 100, the received AC power is provided to the AC output 112 and to the charger 104 for charging of the battery 116. However, since the load 202 is operating in the DC mode, the load 202 draws power via the DC input 210. In order to support the load 202, the DC/DC converter 108 is operated at a full-load state to support the power draw of the load 202 at the DC output 110 of the UPS 100.

In a third scenario 256, the AC power received at both the input 102 of the UPS 100 and the AC input 212 of the load 202 is recognized as being "unacceptable" by the UPS 100 and "acceptable" by the load 202. As a result, the UPS 100 operates in the DC mode and the load 202 operates in the AC mode. In the DC mode of the UPS 100, the charger 104 is turned off (i.e., disabled) and the battery 116 discharges stored DC power to the DC/DC converter 108, via the backup power interface 114 and the DC bus 106. The DC/DC converter 108 regulates the DC power received from the battery 116 and provides regulated DC power to the DC output 110. However, since the load 202 is operating in the AC mode, the load 202 draws power via the AC input 212.

In a fourth scenario 258, the AC power received at both the input 102 of the UPS 100 and the AC input 212 of the load 202 is recognized as being "unacceptable" by both the UPS 100 and the load 202. As a result, both the UPS 100 and the load 202 operate in their respective DC modes of operation. In the DC mode of the UPS 100, the charger 104 is turned off (i.e., disabled) and the battery 116 discharges stored DC power to the DC/DC converter 108, via the backup power interface 114 and the DC bus 106. The DC/DC converter 108 regulates the DC power received from the battery 116 and provides regulated DC power to the DC output 110. While operating in the DC mode, the load 202 draws DC power via the DC input 210.

In some examples, by operating the UPS 100 and the load 202 in different modes, performance of the UPS 100 can be degraded. For example, in the second scenario 254, an excessive amount of heat is generated from the charger 104 and the DC/DC converter 108 operating simultaneously. Likewise, in the third scenario 256, the battery 116 is continuously loaded by the DC/DC converter 108 and is drained off (or partially discharged) while the DC/DC converter 108 operates in a no-load state. As such, it may be desired to prevent the power supply system 200 from operating in these undesirable scenarios.

Figure 3:
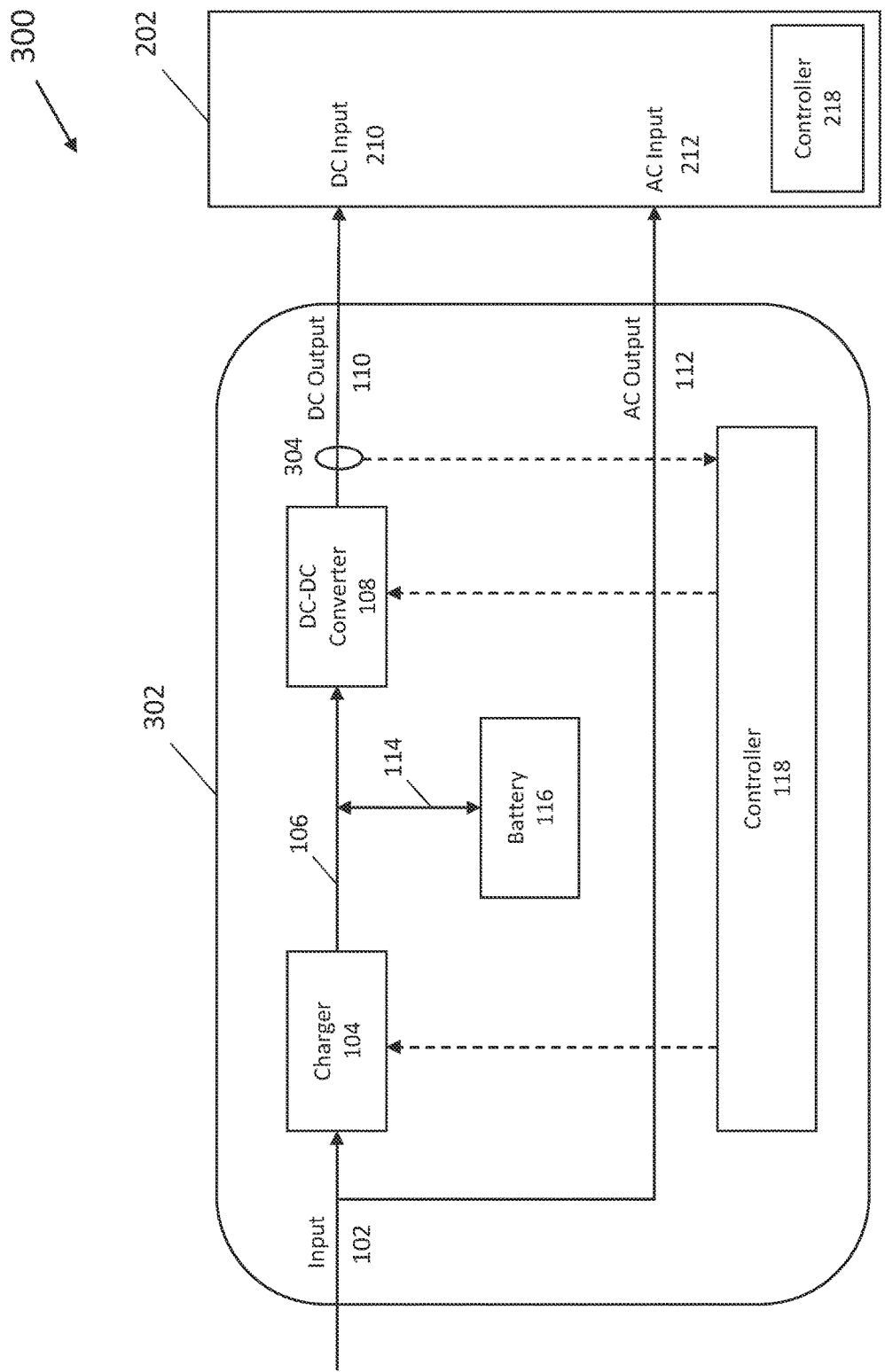
FIG. 3 is a functional block diagram of a power supply system in accordance with aspects described herein.

FIG. 3 a block diagram of one embodiment of a power supply system 300 in accordance with aspects described herein. As shown, the power supply system 300 includes a UPS 302 and the load 202. In one example, the UPS 302 is similar to the UPS 100 of FIG. 1, except the UPS 302 includes a current sensor 304 configured to monitor (or sense) current at the DC output 110 of the UPS 302.

In some examples, the current sensor 304 is included in the controller 118 of the UPS 302; however, in other examples, the current sensor 304 is external to the controller 118. It should be appreciated that this disclosure is not limited to a particular type of current sensor. For example, the current sensor 304 may be any type of current sensor used to detect, monitor, or measure current (e.g., Hall-effect sensor). In certain examples, the current sensor 304 provides values indicating the current demand at the DC output 110 to the controller 118. In other examples, the controller 118 includes additional circuitry (e.g., Analog-to-Digital Converter) configured to process one or more signals provided by the current sensor 304 to determine the current demand at the DC output 110. In some examples, the controller 118 is configured to use the values or signals provided from the current sensor 304 to determine the power demand at the DC output 110.

Figure 4:
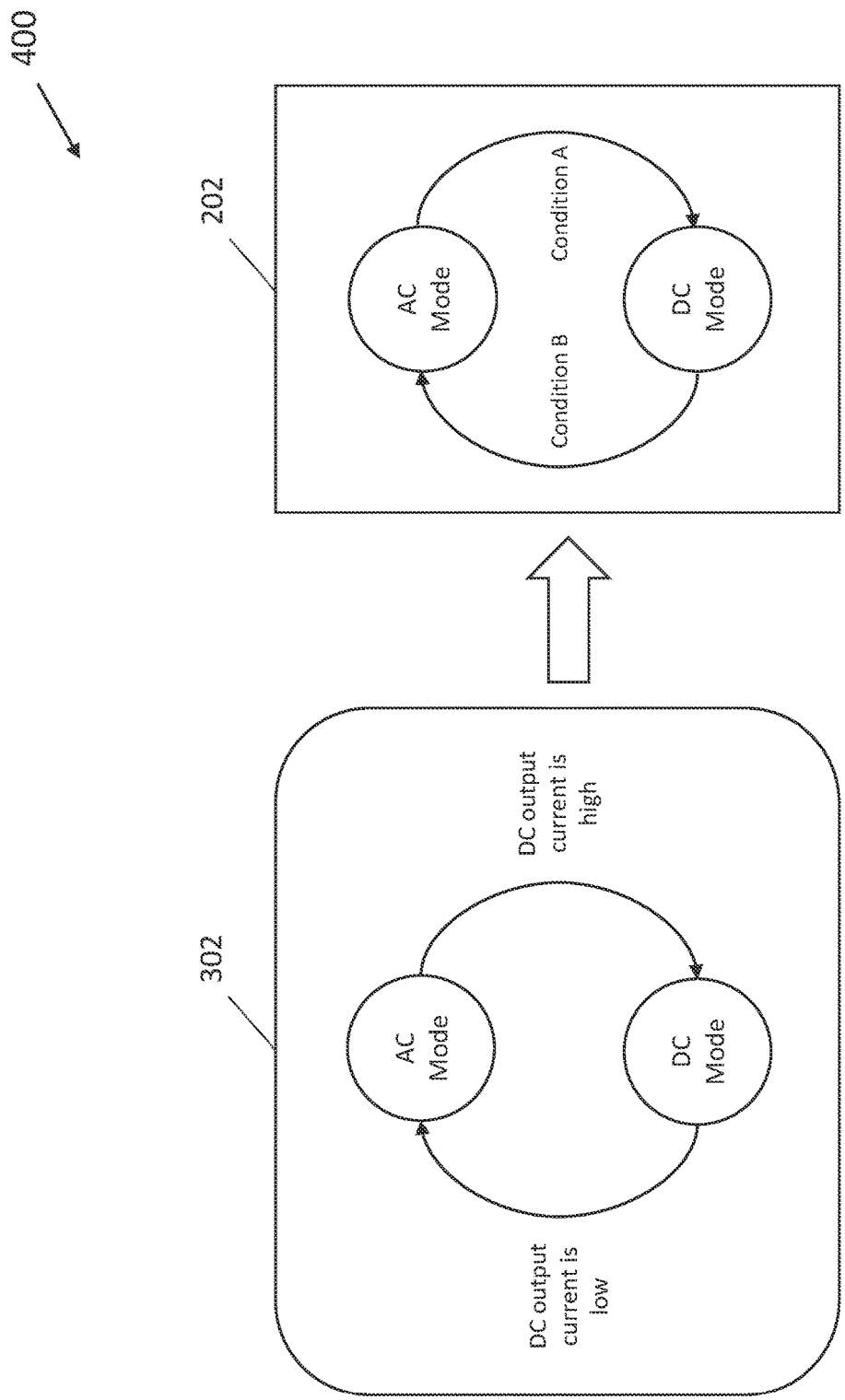
FIG. 4 is a state diagram of a power supply system in accordance with aspects described herein.

FIG. 4 is a state diagram 400 illustrating operation of the power supply system 300 in accordance with aspects described herein. In some examples, the state diagram 400 corresponds to a control method carried out by the controller 118 of the UPS 302.

In one example, the load 202 is configured to operate in either the AC mode or the DC mode based the quality of the AC power provided to the load 202 by the UPS 302. As shown, when the AC power provided by the UPS 302 is recognized as being "unacceptable" by the load 202 (i.e., "Condition A"), the load 202 operates in the DC mode. As such, the load 202 begins to draw power from the DC output 110 of the UPS 302 (via the DC input 210 of the load 202).

As described above, the controller 118 is configured to monitor the current demand at the DC output 110 (via the current sensor 304). In some examples, the controller 118 is configured to monitor the current demand at the DC output 110 relative to a demand threshold. In one example, the demand threshold is a predetermined threshold; however, in other examples, the demand threshold may be a dynamic threshold configured to update based on one or more operating conditions/parameters of the UPS 302 or the load 202. In response to a determination that the current demand at the DC output 110 is above the demand threshold, the UPS 302 is configured to operate in the DC mode. As such, the UPS 302 can detect that the load 202 is operating in the DC mode and transition to its corresponding DC mode without communicating with the load 202. In certain examples, the UPS 302 transitions to the DC mode by disabling the charger 104 to reduce the amount of heat generated by the UPS 302 while the DC/DC converter 108 is operated to support the load 202.

Similarly, when the AC power provided by the UPS 302 is recognized as being "acceptable" by the load 202 (i.e., "Condition B"), the load 202 operates in the AC mode and begins to draw power from the AC output 112 of the UPS 302 (via the AC input 212 of the load 202). As such, the current demand at the DC output 110 of the UPS 302 begins to decrease. In response to a determination that the current demand at the DC output 110 is below the demand threshold, the UPS 302 transitions to the AC mode. As such, the UPS 302 can detect that the load 202 is operating in the AC mode and transition to its corresponding AC mode without communicating with the load 202. In certain examples, the UPS 302 transitions to the AC mode by enabling the charger 104 to charge the battery 116, preventing the battery 116 from being drained off by the DC/DC converter 108 while providing AC power to the AC output 112 to support the load 202.

In some examples, the current sensor 304 can be configured to monitor the current demand at the input of the DC/DC converter 108 to provide an indication of the current demand at the DC output 110. In other examples, the controller 118 is configured to monitor one or more internal parameters of the DC/DC converter 108 to infer the current demand at the DC output 110.

Figure 5:
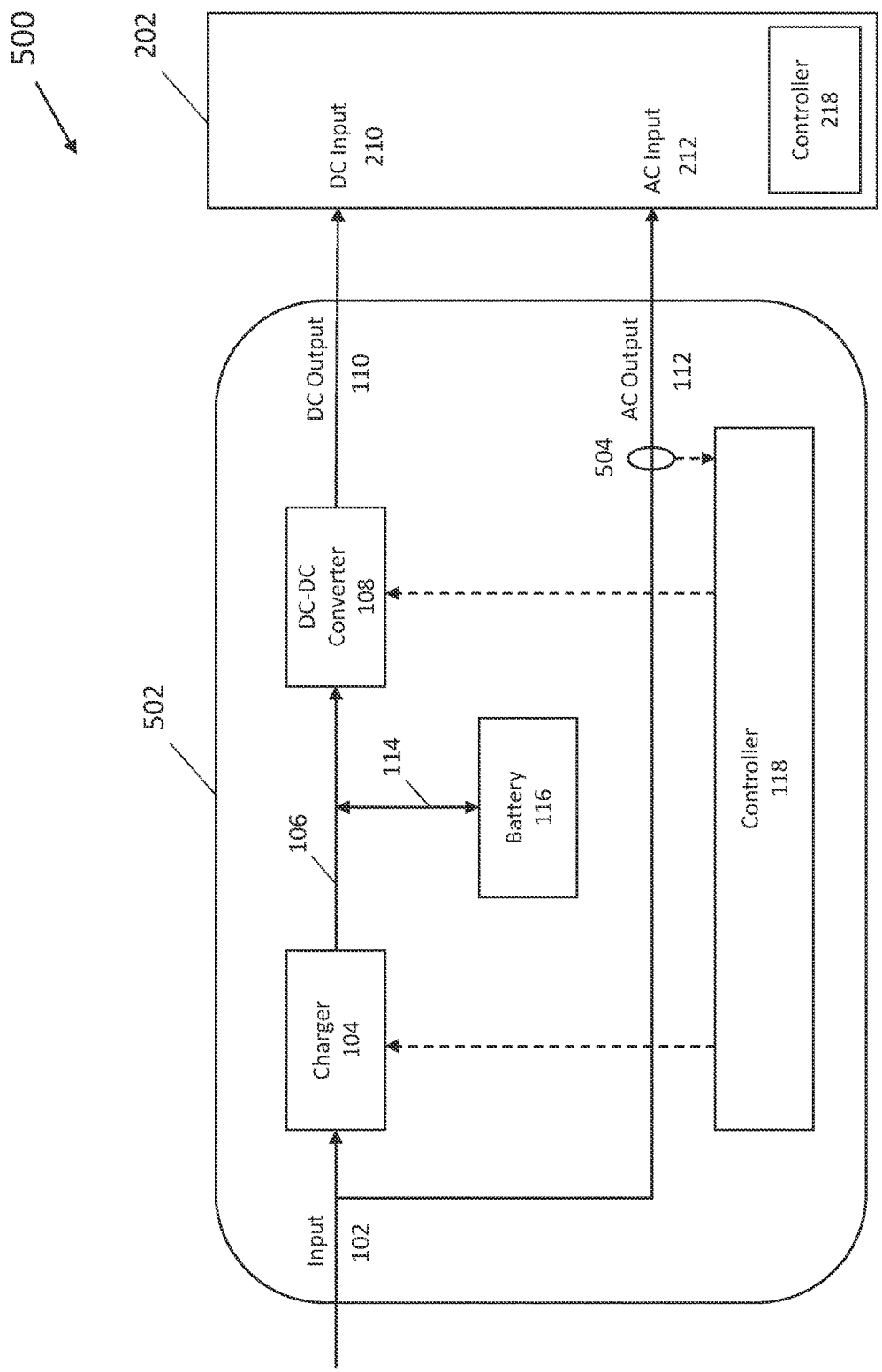
FIG. 5 is a functional block diagram of a power supply system in accordance with aspects described herein.

FIG. 5 a block diagram of another embodiment of a power supply system 500 in accordance with aspects described herein. As shown, the power supply system 500 includes a UPS 502 and the load 202. In one example, the UPS 502 is similar to the UPS 302 of FIG. 3, except the UPS 502 includes a current sensor 504 configured to monitor (or sense) current at the AC output 112 of the UPS 502. In some examples, the current sensor 504 is substantially the same as the current sensor 304 of the UPS 302.

Figure 6:
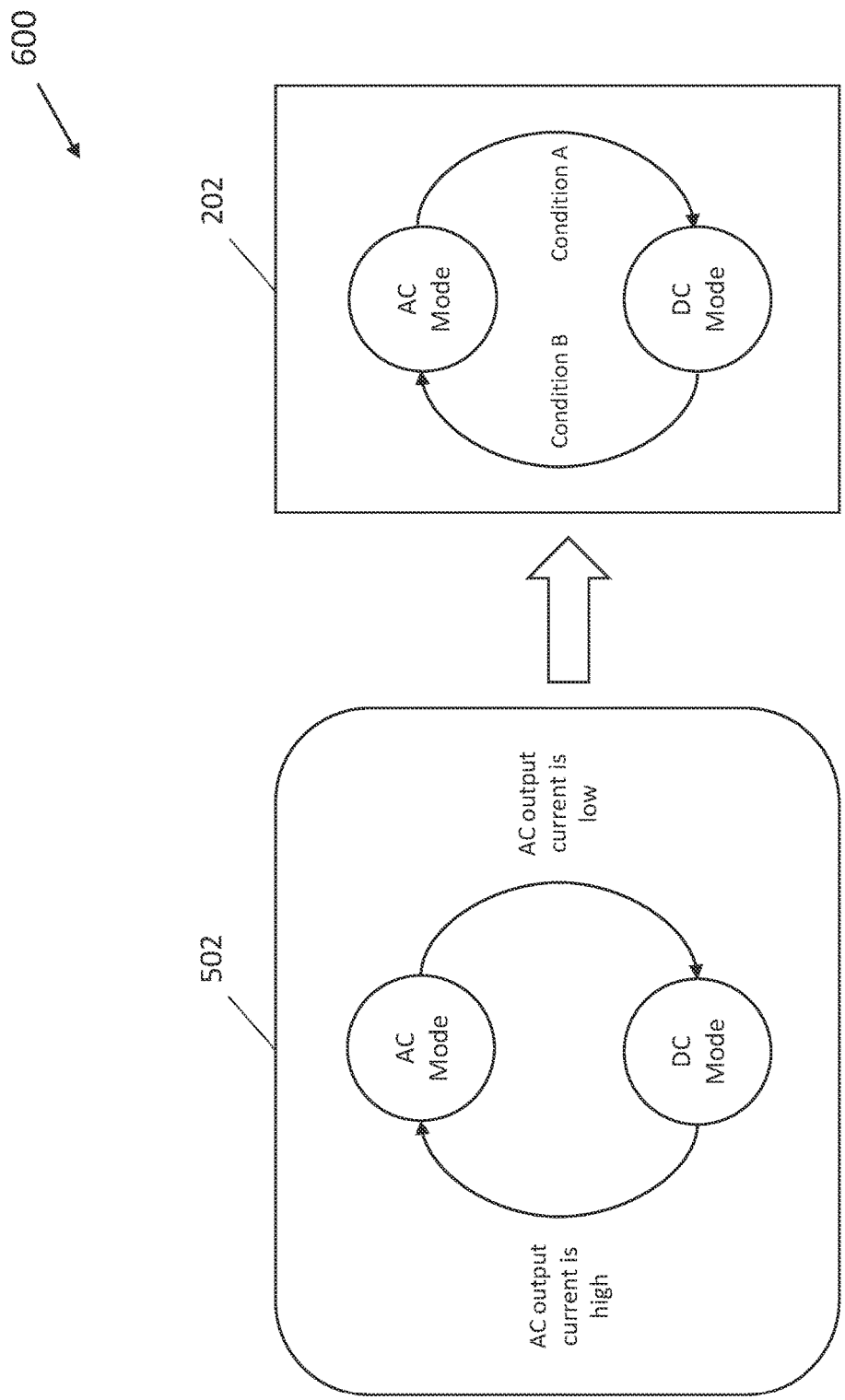
FIG. 6 is a state diagram of a power supply system in accordance with aspects described herein.

FIG. 6 is a state diagram 600 illustrating operation of the power supply system 500 in accordance with aspects described herein. In some examples, the state diagram 600 corresponds to a control method carried out by the controller 118 of the UPS 502.

In one example, the load 202 is configured to operate in either the AC mode or the DC mode based on the quality of the AC power provided to the load 202 by the UPS 502. As shown, when the AC power provided by the UPS 502 is recognized as being "unacceptable" by the load 202 (i.e., "Condition A"), the load 202 operates in the DC mode. As such, the load 202 begins to draw power from the DC output 110 of the UPS 502 (via the DC input 210 of the load 202).

As described above, the controller 118 is configured to monitor the current demand at the AC output 112 (via the current sensor 504). In some examples, the controller 118 is configured to monitor the current demand at the AC output 112 relative to a demand threshold. In one example, the demand threshold is a predetermined threshold; however, in other examples, the demand threshold is a dynamic threshold configured to update based on one or more operating conditions/parameters of the UPS 502 or the load 202. In response to a determination that the current demand at the AC output 110 is below the demand threshold, the UPS 502 is configured to operate in the DC mode. As such, the UPS 502 can detect that the load 202 is operating in the DC mode and transition to its corresponding DC mode without communicating with the load 202. In certain examples, the UPS 502 transitions to the DC mode by disabling the charger 104 to reduce the amount of heat generated by the UPS 502 while the DC/DC converter 108 is operated to support the load 202.

Similarly, when the AC power provided by the UPS 502 is recognized as being "acceptable" by the load 202 (i.e., "Condition B"), the load 202 operates in the AC mode and begins to draw power from the AC output 112 of the UPS 502 (via the AC input 212 of the load 202). As such, the current demand at the AC output 112 of the UPS 502 begins to increase. In response to a determination that the current demand at the AC output 112 is above the demand threshold, the UPS 502 transitions to the AC mode. As such, the UPS 502 can detect that the load 202 is operating in the AC mode and transition to its corresponding AC mode without communicating with the load 202. In certain examples, the UPS 502 transitions to the AC mode by enabling the charger 104 to charge the battery 116, preventing the battery 116 from being drained off by the DC/DC converter 108 while providing AC power to the AC output 112 to support the load 202.

In some examples, the UPS (e.g., 302 or 502) can be configured to monitor the current demand at both the DC output 110 and the AC output 110. By monitoring both the DC output 110 and the AC output 112, the UPS may be capable of anticipating a mode transition of the load 202. As such, the UPS may transition between the AC mode and the DC mode with a faster response time, which can be beneficial in specific high performance applications.

As described above, an improved system and method for controlling a UPS is provided herein. In at least one embodiment, the current demand at the DC output and/or the AC output of the UPS is monitored relative to a demand threshold. In one example, based on a comparison of the current demand and the demand threshold, the UPS is operated in either the AC mode or the DC mode to match the operating mode of the load. In some examples, transitioning the UPS between the AC and DC modes of operation includes enabling/disabling the charger of the UPS.

Having thus described several aspects of at least one embodiment of this invention, it is to be appreciated various alterations, modifications, and improvements will readily occur to those skilled in the art. Such alterations, modifications, and improvements are intended to be part of this disclosure and are intended to be within the spirit and scope of the invention. Accordingly, the foregoing description and drawings are by way of example only.

What is claimed is:

1. A power system, the power system comprising:
an input configured to receive input AC power;
a DC output configured to provide output DC power to a load;
an AC output configured to provide output AC power to the load;
an AC/DC converter coupled to the input and configured to convert the input AC power into DC power;
a DC bus coupled to the AC/DC converter and configured to receive the DC power;
a bypass line coupled between the input and the AC output and configured to provide the input AC power to the AC output as the AC output power; and
a controller coupled to the AC/DC converter and configured to:
monitor a current demand at the DC output relative to a demand threshold;
operate, in response to a determination that the current demand at the DC output is below the demand threshold, the power system in a first mode of operation by enabling the AC/DC converter to provide DC power to the DC bus; and
operate, in response to a determination that the current demand at the DC output is above the demand threshold, the power system in a second mode of operation by disabling the AC/DC converter.

2. The power system of claim 1, wherein the demand threshold is a predetermined threshold.

3. The power system of claim 1, wherein the power system is configured to operate in the first mode of operation to support the load while the load is drawing AC power from the AC output.

4. The power system of claim 1, wherein the power system is configured to operate in the second mode of operation to support the load while the load is drawing DC power from the DC output.

5. A power system, the power system comprising:
an input configured to receive input AC power;
a DC output configured to provide output DC power to a load;
an AC output configured to provide output AC power to the load;
an AC/DC converter coupled to the input and configured to convert the input AC power into DC power;
a DC bus coupled to the AC/DC converter and configured to receive the DC power;
a bypass line coupled between the input and the AC output and configured to provide the input AC power to the AC output as the AC output power; and
a controller coupled to the AC/DC converter and configured to:
monitor a current demand at the AC output relative to a demand threshold;
operate, in response to a determination that the current demand at the AC output is above the demand threshold, the power system in a first mode of operation by enabling the AC/DC converter to provide DC power to the DC bus; and
operate, in response to a determination that the current demand at the AC output is below the demand threshold, the power system in a second mode of operation by disabling the AC/DC converter.

6. The power system of claim 5, wherein the demand threshold is a predetermined threshold.

7. The power system of claim 5, wherein the power system is configured to operate in the first mode of operation to support the load while the load is drawing AC power from the AC output.

8. The power system of claim 5, wherein the power system is configured to operate in the second mode of operation to support the load while the load is drawing DC power from the DC output.

9. A non-transitory computer-readable medium storing thereon sequences of computer-executable instructions for operating a power supply, the sequences of computer-executable instructions including instructions that instruct at least one processor to control the power supply to:
receive input AC power at an input from an input power source;
provide, via a DC output, output DC power to a load;
provide, via an AC output, output AC power to the load;
monitor a current demand at the DC output relative to a demand threshold;
operate, in response to a determination that the current demand at the DC output is below the demand threshold, the power supply in a first mode of operation by enabling an AC/DC converter coupled to the input to convert the input AC power into DC power; and
operate, in response to a determination that the current demand at the DC output is above the demand threshold, the power supply in a second mode of operation by disabling the AC/DC converter.

10. The non-transitory computer readable medium according to claim 9, wherein the power supply is operated in the first mode of operation to support the load while the load is drawing AC power from the AC output.

11. The non-transitory computer readable medium according to claim 9, wherein the power supply is operated in the second mode of operation to support the load while the load is drawing DC power from the DC output.

12. A non-transitory computer-readable medium storing thereon sequences of computer-executable instructions for operating a power supply, the sequences of computer-executable instructions including instructions that instruct at least one processor to control the power supply to:
receive input AC power at an input from an input power source;
provide, via a DC output, output DC power to a load;
provide, via an AC output, output AC power to the load;
monitor a current demand at the AC output relative to a demand threshold;
operate, in response to a determination that the current demand at the AC output is above the demand threshold, the power supply in a first mode of operation by enabling an AC/DC converter coupled to the input to convert the input AC power into DC power; and
operate, in response to a determination that the current demand at the AC output is below the demand threshold, the power supply in a second mode of operation by disabling the AC/DC converter.

13. The non-transitory computer readable medium according to claim 12, wherein the power supply is operated in the first mode of operation to support the load while the load is drawing AC power from the AC output.

14. The non-transitory computer readable medium according to claim 12, wherein the power supply is operated in the second mode of operation to support the load while the load is drawing DC power from the DC output.

15. A method for providing DC and AC in a power system including an input configured to receive input AC power; a DC output configured to provide output DC power to a load; an AC output configured to provide output AC power to the load; an AC/DC converter coupled to the input and configured to convert the input AC power into DC power; a DC bus coupled to the AC/DC converter and configured to receive the DC power; a bypass line coupled between the input and the AC output and configured to provide the input AC power to the AC output as the AC output power, the method comprising:
monitoring a current demand at the DC output relative to a demand threshold;
operating, in response to determining that the current demand at the DC output is below the demand threshold, the power system in a first mode of operation by enabling the AC/DC converter to provide DC power to the DC bus; and
operating, in response to determining that the current demand at the DC output is above the demand threshold, the power system in a second mode of operation by disabling the AC/DC converter.

16. The method of claim 15, wherein the demand threshold is a predetermined threshold.

17. The method of claim 15, further comprising operating the power system in the first mode of operation to support the load while the load is drawing AC power from the AC output.

18. The method of claim 15, further comprising operating the power system in the second mode of operation to support the load while the load is drawing DC power from the DC output.

19. A method for providing DC and AC in a power system including an input configured to receive input AC power; a DC output configured to provide output DC power to a load; an AC output configured to provide output AC power to the load; an AC/DC converter coupled to the input and configured to convert the input AC power into DC power; a DC bus coupled to the AC/DC converter and configured to receive the DC power; a bypass line coupled between the input and the AC output and configured to provide the input AC power to the AC output as the AC output power, the method comprising:

monitoring a current demand at the AC output relative to a demand threshold;

operating, in response to determining that the current demand at the AC output is above the demand threshold, the power system in a first mode of operation by enabling the AC/DC converter to provide DC power to the DC bus; and operating, in response to determining that the current demand at the AC output is below the demand threshold, the power system in a second mode of operation by disabling the AC/DC converter.

20. The method of claim 19, wherein the demand threshold is a predetermined threshold.

21. The method of claim 19, further comprising operating the power system in the first mode of operation to support the load while the load is drawing AC power from the AC output.

22. The method of claim 19, further comprising operating the power system in the second mode of operation to support the load while the load is drawing DC power from the DC output.

* * * * *